United States Patent
Kudo et al.

(10) Patent No.: US 10,343,718 B2
(45) Date of Patent: *Jul. 9, 2019

(54) DRIVER ASSISTANCE SYSTEM FOR VEHICLE

(71) Applicant: TOYOTA JIDOSHA KABUSHIKI KAISHA, Toyota-shi, Aichi-Ken (JP)

(72) Inventors: Yoshio Kudo, Tokyo (JP); Yoji Kunihiro, Susono (JP); Satoru Yabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,999

(22) Filed: Dec. 12, 2017

(65) Prior Publication Data

US 2018/0201317 A1 Jul. 19, 2018

(30) Foreign Application Priority Data

Jan. 13, 2017 (JP) .................................. 2017-004427

(51) Int. Cl.
  *B62D 15/02* (2006.01)
  *B60W 10/20* (2006.01)
  *B60W 30/12* (2006.01)

(52) U.S. Cl.
  CPC ........... *B62D 15/025* (2013.01); *B60W 10/20* (2013.01); *B60W 30/12* (2013.01); *B62D 15/0255* (2013.01); *B60W 2540/18* (2013.01)

(58) Field of Classification Search
  USPC ......................................................... 701/41
  See application file for complete search history.

(56) References Cited

U.S. PATENT DOCUMENTS 9,592,850 B1 * 3/2017 Kataoka ................. B62D 1/286
2007/0021889 A1 1/2007 Tsuchiya
(Continued)

FOREIGN PATENT DOCUMENTS

JP 2002-012159 A 1/2002
JP 2007-030612 A 2/2007
(Continued)

OTHER PUBLICATIONS

Nov. 7, 2018 Notice of Allowance issued in U.S. Appl. No. 15/810,702.

*Primary Examiner* — Tyler D Paige
(74) *Attorney, Agent, or Firm* — Oliff PLC

(57) ABSTRACT

A driver assistance system for a vehicle executes, as steering control using an EPS device, automated steering control for causing an actual steering angle of a wheel to approach a target steering angle and steering angle return control for returning the actual steering angle to a neutral point in response to a steering operation by a driver being ended during non-automated steering control. Under comparison in a condition where a first angle difference is equal to a second angle difference, the driver assistance system is configured, in reverting to the automated steering control after a steering intervention of the driver is performed during the automated steering control and causing the actual steering angle to approach the target steering angle, to change the actual steering angle with a change rate that is lower than that in returning the actual steering angle to the neutral point during the steering angle return control.

3 Claims, 5 Drawing Sheets

(56) References Cited

U.S. PATENT DOCUMENTS

| | | | |
|---|---|---|---|
| 2007/0043490 A1 | 2/2007 | Yokota et al. | |
| 2008/0021612 A1 | 1/2008 | Sakuma | |
| 2008/0243339 A1 | 10/2008 | Nishimori et al. | |
| 2012/0197496 A1* | 8/2012 | Limpibunterng | B62D 1/286 701/42 |
| 2013/0253767 A1* | 9/2013 | Lee | B60W 50/04 701/42 |
| 2013/0304327 A1 | 11/2013 | Morishita et al. | |
| 2015/0066241 A1 | 3/2015 | Akiyama | |
| 2016/0001781 A1* | 1/2016 | Fung | B60W 40/08 701/36 |
| 2017/0088174 A1 | 3/2017 | Inoue et al. | |
| 2017/0327150 A1 | 11/2017 | Kim et al. | |
| 2018/0201307 A1* | 7/2018 | Kudo | B62D 1/28 |
| 2018/0201317 A1* | 7/2018 | Kudo | B60W 10/20 |

FOREIGN PATENT DOCUMENTS

| | | |
|---|---|---|
| JP | 2015-033942 A | 2/2015 |
| JP | 2017-177944 A | 10/2017 |

\* cited by examiner

AA: Target steering angle (neutral point)
BB: Actual steering angle
CC: Positive
DD: Negative
EE: Differentiator

DRIVER ASSISTANCE SYSTEM FOR VEHICLE

CROSS-REFERENCE TO RELATED APPLICATION

This application is based on and claims the benefit of Japanese Patent Application No. 2017-004427, filed on Jan. 13, 2017, which is incorporated by reference herein in its entirety.

BACKGROUND

Technical Field

The present disclosure relates to a driver assistance system for a vehicle, and more particularly to a driver assistance system for a vehicle that controls a steering angle of a wheel by the use of an electric power steering device.

Background Art

JP 2007-030612 A discloses an electric power steering (EPS) device that performs a lane keeping assist control. This EPS device calculates a base assist torque used to assist a steering operation by a driver of the vehicle. Moreover, the EPS device calculates a lane keeping assist torque for the vehicle to run at a certain position in a driving lane. In more detail, the lane keeping assist torque is calculated by performing PID control on the basis of a difference between an offset of the vehicle with respect to a driving path and a target offset, and on the basis of a difference between a yaw angle and a target yaw angle. Moreover, in order to improve the steering feeling during execution of the lane keeping assist control, the EPS device corrects a compensating torque (a compensating control amount) for compensating the basic assist torque (a basic assist control amount) in accordance with the lane keeping assist torque (a lane keeping assist control amount).

In addition to JP 2007-030612 A, JP 2015-033942 A is a patent document which may be related to the present disclosure.

SUMMARY

The lane keeping assist control disclosed in JP 2007-030612 A corresponds to an example of "automated steering control" that controls an electric motor of the electric power steering device so as to generate a steering torque for causing an actual steering angle of a wheel to approach a target steering angle. During execution of the automated steering control, a situation is assumed where, after a steering intervention of the driver is performed, the automated steering control resumes to cause the actual steering angle of the wheel to approach the target steering angle. According to the lane keeping assist control disclosed in JP 2007-030612 A, when the deviation of the actual steering angle of the wheel with respect to the target steering angle becomes greater due to the steering operation by the driver in this kind of situation, the difference of the PID control described above becomes greater. As a result, a calculation value of the lane keeping assist torque becomes greater. If a large lane keeping assist torque is applied, there is the possibility that the rate of change of the actual steering angle (that is, the actual steering angle change rate) may increase excessively. As a result, there is a concern that the driver may feel uncomfortable about an automated steering being suddenly performed (and about the behavior of the vehicle being suddenly performed in association therewith).

Based on the above, it can be said that it is desirable that, when the automated steering control resumes after a steering intervention of the driver is performed during execution of the automated steering control, an appropriate consideration is taken with respect to the rate of change of the actual steering angle in causing the actual steering angle to approach the target steering angle.

The present disclosure has been made to address the problem described above, and an object of the present disclosure is to provide a driver assistance system for a vehicle that, when automated steering control resumes after a steering intervention of the driver is performed during execution of the automated steering control by the use of an electric power steering device, can control the rate of change of the actual steering angle of a wheel properly and softly in causing the actual steering angle to approach a target steering angle by the use of the electric power steering device.

A driver assistance system for a vehicle according to the present disclosure is applied to the vehicle including an electric power steering device equipped with an electric motor that is driven to control a steering angle of a wheel.

Steering control of the wheel executed by the driver assistance system using the electric power steering device includes:

automated steering control that controls the electric motor so as to generate a steering torque for causing an actual steering angle of the wheel to approach a target steering angle; and steering angle return control that controls the electric motor so as to generate a return torque for returning the actual steering angle of the wheel to a neutral point in response to a steering operation by a driver being ended during non-execution of the automated steering control.

Under comparison in a condition where a first angle difference between the actual steering angle of the wheel and the target steering angle in the automated steering control is equal to a second angle difference between the actual steering angle of the wheel and the neutral point in the steering angle return control, the driver assistance system is configured, in reverting to the automated steering control after a steering intervention of the driver is performed during execution of the automated steering control and causing the actual steering angle of the wheel to approach the target steering angle, to change the actual steering angle of the wheel with a change rate that is lower than that in returning the actual steering angle of the wheel to the neutral point during execution of the steering angle return control.

The driver assistance system may further comprise:

an automated steering control section configured to calculate a basic steering control amount for causing the first angle difference to approach zero and a correction term for reducing an absolute value of a difference between a first target steering angle speed based on the first angle difference and a change rate of the first angle difference, and to calculate, as a final steering control amount, a sum of the basic steering control amount and the correction term that are calculated; and a steering angle return control section configured to calculate a return control amount for reducing an absolute value of a difference between a second target steering angle speed based on the second angle difference and an actual steering angle speed of the wheel during execution of the steering angle return control.

In a first angle difference range in which an absolute value of the first angle difference is greater than a certain value, the first target steering angle speed may be lower than the second target steering angle speed under comparison in the condition where the first angle difference is equal to the second angle difference.

In a second angle difference range in which the absolute value of the first angle difference is smaller than or equal to the certain value, the first target steering angle speed may be higher than the second target steering angle speed under comparison in the condition where the first angle difference is equal to the second angle difference.

The first angle difference range may be used during a steering operation by the driver being performed in the automated steering control.

The second angle difference range may be used during the actual steering angle of the wheel being caused to follow the target steering angle without a steering operation by the driver in the automated steering control.

The correction term may be obtained by multiplying the difference between the first target steering angle speed and the change rate of the first angle difference by a first gain. The return control amount may be obtained by multiplying the difference between the second target steering angle speed and an actual steering angle speed by a second gain. The first gain may be greater than the second gain.

According to the driver assistance system for a vehicle of the present disclosure, the change rate of the actual steering angle of the wheel is controlled, in a following manner, in reverting to the automated steering control after a steering intervention of the driver is performed during execution of the automated steering control and causing the actual steering angle of the wheel to approach the target steering angle. That is, in reverting to the automated steering control as just described, under comparison in a condition where the first angle difference between the actual steering angle of the wheel and the target steering angle in the automated steering control is equal to the second angle difference between the actual steering angle of the wheel and the neutral point in the steering angle return control, the actual steering angle of the wheel is changed with a change rate that is lower than that in returning the actual steering angle of the wheel to the neutral point during execution of the steering angle return control.

The steering angle return control is performed when the driver that is the driving entity does not have an intention to steer (in other words, when the return of the actual steering angle to the neutral point is allowed). In contrast to this, the control to return the actual steering angle to the target steering angle after a steering intervention of the driver is performed during execution of the automated steering control is not based on the intention of the driver (more specifically, according to this control, a steering operation is performed toward the target steering angle which the driver does not always recognize). According to the driver assistance system of the present disclosure, when a steering operation toward the target steering angle is performed by this kind of automated steering control, a change of the actual steering angle can be slowed as compared to during execution of the steering angle return control in which it can be said that the driver can recognize a possible change of the actual steering angle. Therefore, according to the driver assistance system of the present disclosure, the change rate of the actual steering angle in reverting to the automated steering control can be controlled properly and softly while reducing a feeling of strangeness of the driver regarding the automated steering.

DETAILED DESCRIPTION

In the following, an embodiment of the present disclosure is described with reference to the accompanying drawings. However, it is to be understood that even when the number, quantity, amount, range or other numerical attribute of an element is mentioned in the following description of the embodiment, the present disclosure is not limited to the mentioned numerical attribute unless explicitly described otherwise, or unless the present disclosure is explicitly specified by the numerical attribute theoretically. Further, structures or steps or the like that are described in conjunction with the following embodiment are not necessarily essential to the present disclosure unless explicitly shown otherwise, or unless the present disclosure is explicitly specified by the structures, steps or the like theoretically.

[Example of Configuration of Vehicle Equipped with Driver Assistance System]

Figure 1:
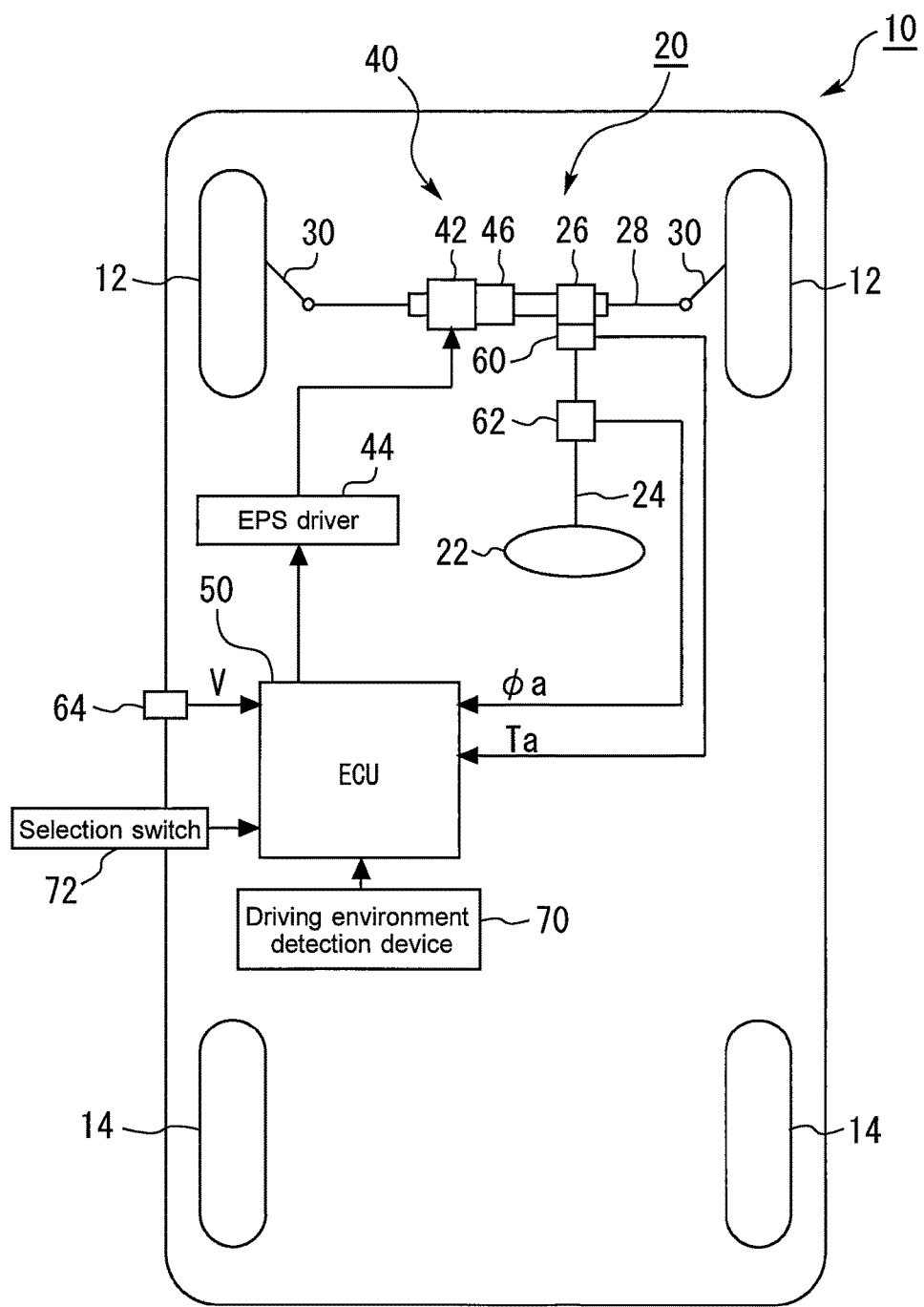
FIG. 1 is a schematic diagram that illustrates a configuration example of a vehicle to which a driver assistance system according to an embodiment of the present disclosure is applied.

FIG. 1 is a schematic diagram that illustrates a configuration example of a vehicle 10 to which the driver assistance system according to an embodiment of the present disclosure is applied. As shown in FIG. 1, the vehicle 10 is equipped with two front wheels 12 and two rear wheels 14.

The vehicle 10 is provided with a steering device 20. The steering device 20 is used to turn the two front wheels 12. More specifically, the steering device 20 includes a steering wheel 22, a steering shaft 24, a pinion gear 26, a rack bar 28, tie rods 30 and an electric power steering device (hereafter, referred to as an "EPS (Electric Power Steering) device") 40. It should be noted that the driver assistance system according to the present embodiment can also be applied to an example of 4WS (Four Wheel Steering) vehicle in which both the front wheels 12 and the rear wheels 14 are steered.

The steering wheel 22 is used for a steering operation by the driver. That is, the driver turns the steering wheel 22 when the driver wants to turn the front wheels 12. One end of the steering shaft 24 is connected to the steering wheel 22. The other end of the steering shaft 24 is connected to the pinion gear 26. The pinion gear 26 is engaged with the rack bar 28. Both ends of the rack bar 28 are respectively connected to the left and right front wheels 12 through the tie rods 30. The rotation of the steering wheel 22 is transmitted to the pinion gear 26 through the steering shaft 24. The rotational motion of the pinion gear 26 is converted into a linear motion of the rack bar 28, and thereby the steering angle of the front wheels 12 changes.

The EPS device 40 is a device for generating a force to turn the front wheels 12. To be more specific, the EPS device 40 is equipped with an electric motor 42 and an EPS driver 44. As an example, the electric motor 52 is connected to the rack bar 28 with a conversion mechanism 46 interposed therebetween. The conversion mechanism 46 is a ball screw, for example. When a rotor of the electric motor 42 rotates, the conversion mechanism 46 converts the rotational motion into a linear motion of the rack bar 28, and thereby the steering angle of the front wheels 12 changes.

The EPS driver 44 is a device for driving the electric motor 42, and includes an inverter. The inverter converts a DC power supplied from a DC power source (not shown) to an AC power and supplies the AC power to the electric motor 42 to drive the electric motor 42. With the EPS driver 44 controlling the rotation of the electric motor 42, it is possible to turn the front wheels 12. This operation of the EPS driver 44, that is, the operation of the EPS device 40 is controlled by an ECU 50 described below. Details of the control of the EPS device 40 by the ECU 50 will be described later.

The ECU (Electronic Control Unit) 50 is mounted in the vehicle 10. Various sensors for detecting a variety of state quantities of the vehicle 10 are electrically connected to the ECU 50. The various sensors mentioned here include a steering torque sensor 60, a steering angle sensor 62 and a vehicle speed sensor 64, for example.

The steering torque sensor 60 detects a steering torque Ta applied to the steering shaft 24. The steering torque sensor 60 outputs a steering torque signal depending on the steering torque Ta to the ECU 50.

The steering angle sensor 62 detects a rotation angle $\varphi a$ of the steering shaft 24. This rotation angle $\varphi a$ is the same as the steering angle of the steering wheel 22. The steering angle sensor 62 outputs a steering angle signal depending on the rotation angle $\varphi a$ to the ECU 50. There is a correlation between the steering angle of the steering wheel 22 and the steering angle of the front wheels 12. Thus, by setting a relationship therebetween in advance, an actual steering angle $\theta a$ of the front wheels 12 can be calculated as a value depending on the rotation angle $\varphi a$ that is detected by the steering angle sensor 62.

The vehicle speed sensor 64 detects a vehicle speed V that is the speed of the vehicle 10 to output a detected vehicle speed signal depending on the vehicle speed V to the ECU 50.

Moreover, a driving environment detection device 70 is mounted in the vehicle 10. In automated driving control of the vehicle 10 described later, the driving environment detection device 70 acquires "driving environment information" used for detection of a driving lane in which the vehicle 10 is traveling. First, the driving environment information is exemplified by a surrounding target information regarding a target around the vehicle 10. The surrounding target includes a moving target and a stationary target. The moving target is exemplified by a surrounding vehicle and a pedestrian. Information on the moving target includes a position and a speed of the moving target. The stationary target is exemplified by a roadside structure and a white line. Information on the stationary target includes a position of the stationary target.

In order to detect the surrounding target information, the driving environment detection device 70 is provided with a stereo camera that images a situation around the vehicle 10, for example. An image imaged by the stereo camera is sequentially sent to the ECU 50 as an image data. The ECU 50 performs an image processing for a sent image data. As a result, the ECU 50 can detect a driving lane of the vehicle 10 based on a white line included in the image data. It should be noted that, in order to detect the surrounding target information, at least one of a LIDAR (Laser Imaging Detection and Ranging) and a millimeter-wave radar may be, for example, used instead of the stereo camera or along therewith. The LIDAR uses laser lights to detect a target around the vehicle 10. The millimeter-wave radar uses radio waves to detect a target around the vehicle 10.

Moreover, in order to detect the driving lane of the vehicle 10, a position-orientation information of the vehicle 10 may also be used as the driving environment information, instead of the surrounding target information or along therewith. The position-orientation information can be, for example, acquired by means of a GPS (Global Positioning System) device. The GPS device receives signals transmitted from a plurality of GPS satellites and calculates a position and a posture (i.e. orientation) of the vehicle 10 based on the received signals. The GPS device sends the calculated position-orientation information to the ECU 50.

The driving environment information for the automated driving control may further include a lane information and an infrastructure provided information, for example. In order to automatically perform a lane change, the driving environment detection device 70 may also include a map database for acquiring the lane information and a communication device for acquiring the infrastructure provided information. Lane information indicating a geometry of each lane on a map is recorded in the map database. Based on the map database and a position of the vehicle 10, it is possible to acquire the lane information around the vehicle 10. The communication device acquires an infrastructure provided information from an information provision system. The infrastructure provided information is exemplified by a traffic information, a roadwork section information, and so forth. In an example in which the communication device is provided, the communication device sends this kind of infrastructure provided information to the ECU 50. A target steering angle $\theta 1t$ described later may be calculated with taking into consideration at least one of this kind of lane information and infrastructure provided information.

Furthermore, the vehicle 10 is equipped with a selection switch 72 for the driver to select ON/OFF of the automated driving control.

The ECU 50 includes a processor, a memory, and an input/output interface. The input/output interface receives sensor signals of the various sensors described above and the driving environment information from the driving environment detection device 70. Also, the input/output interface receives, from the selection switch 72, a request concerning the execution of the automated driving control from the driver.

The ECU 50 performs various driving controls concerning the driving of the vehicle 10. One of the driving controls performed by the ECU 50 is steering control of the front wheels 12 performed by the use of the EPS device 40. The driving controls performed by the ECU 50 also includes the automated driving control for controlling the automated driving of the vehicle 10.

Figure 2:
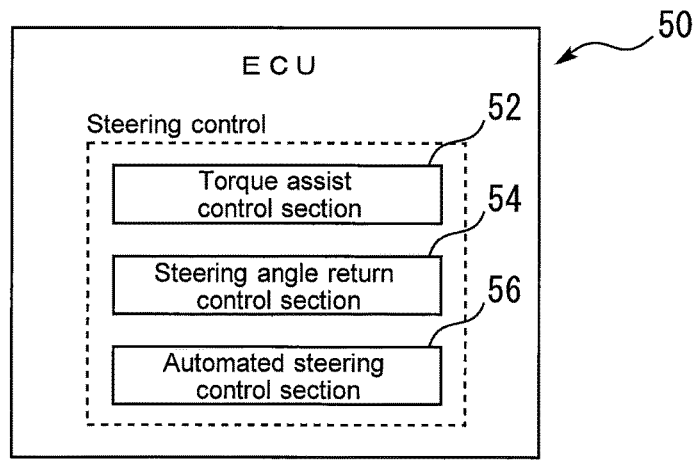
FIG. 2 is a block diagram that illustrates a functional configuration of an ECU as to steering control using an EPS device.

FIG. 2 is a block diagram that illustrates a functional configuration of the ECU 50 as to the steering control using the EPS device 40. The ECU 50 includes a torque assist control section 52 for performing steering torque assist control, a steering angle return control section 54 for performing steering angle return control and an automated steering control section 56 for automated steering control, as functional blocks relating to the steering control using the EPS device 40. The automated driving control includes not only the automated steering control but also automated acceleration/deceleration control concerning the acceleration/deceleration of the vehicle 10. The ECU 50 entirely manages the automated driving control including the automated acceleration/deceleration control as well as the automated steering control. The automated steering control section 56 corresponds to a functional block that focuses on the automated steering control of the automated driving control performed by the ECU 50.

The steering torque assist control is performed to assist the steering operation by the driver while the automated steering control is not performed. In order to perform the steering torque assist control, the torque assist control section 52 controls the operation of the EPS driver 44 of the EPS device 40 to control the electric motor 42.

The steering angle return control is performed to generate a return torque for returning the steering angle of the front wheels 12 to a neutral point (that is, the steering angle at which the straight running of the vehicle 10 is achieved) when turning of the front wheels by the driver is ended during non-execution of the automated steering control. In order to perform the steering angle return control, the steering angle return control section 54 controls the operation of the EPS driver 44 to control the electric motor 42.

The automated steering control section 56 controls the electric motor 42 by controlling the operation of the EPS driver 44 of the EPS device 40 such that a steering torque for causing the steering angle (the actual steering angle $\theta a$) of the front wheels 12 to approach the target steering angle $\theta 1t$. As a result, an automated steering function is achieved. In addition, in the present embodiment, the automated acceleration/deceleration control can be performed in an arbitrary manner in accordance with a known control method.

The function blocks shown in FIG. 2 are achieved by the processor of the ECU 50 executing a control program stored in the memory, on the basis of the detected information from the various sensors described above, the driving environment information of the driving environment detection device 70 and the operation information of the selection switch 72. It should be noted that the ECU including various functional blocks, such as the torque assist control section 52, the steering angle return control section 54 and the automated steering control section 56, may not be always configured by a single ECU as with the ECU 50. For example, the ECU may be provided separately for each functional block. In addition, the steering angle return control section 54 and the automated steering control section 56 that control the EPS device 40 on the basis of the information inputted from various sensors, such as the steering torque sensor 60 and the steering angle sensor 62, and the driving environment detection device 70 and the selection switch 72 correspond to the driver assistance system of the present embodiment.

[Steering Control According to this Embodiment]

In the present embodiment, the steering torque assist control, the steering angle return control and the automated steering control correspond to the steering control performed by the use of the EPS device 40. The steering torque assist control and the steering angle return control of these controls are performed during non-execution of the automated driving.

1. Steering Control During Non-Execution of Automated Driving 1-1. Steering Torque Assist Control While the selection switch 72 is turned OFF (that is, during non-execution of the automated driving), a driving entity is the driver, and the driver operates the steering wheel 22. That is, the steering angle of the front wheels 12 is determined by the driver's operation.

1-1-1. Basic Processing of Steering Torque Assist Control

The torque assist control section 52 performs the "steering torque assist control" by the use of the EPS device 40. More specifically, the torque assist control section 52 receives a steering torque signal from the steering torque sensor 60. The torque assist control section 52 calculates an assist torque on the basis of a steering torque Ta and controls the EPS driver 44 such that the assist torque is obtained.

For example, the torque assist control section 52 has a torque map indicating a relationship between an input parameter and the assist torque. The input parameter includes the steering torque Ta detected by the steering torque sensor 60. The input parameter may further include the vehicle speed V detected by the vehicle speed sensor 64. The torque map is determined in advance in consideration of desired assist characteristics. In response to an operation of the steering wheel 22 by the driver, the torque assist control section 52 refers to the torque map to calculate the assist torque according to the input parameter.

Then, the torque assist control section 52 calculates a target electric current command value according to the assist torque and outputs the target electric current command value to the EPS driver 44. The EPS driver 44 drives (actuates) the electric motor 42 in accordance with the target electric current command value. A rotational torque (i.e. the assist torque) of the electric motor 42 is transmitted to the rack bar 28 through the conversion mechanism 46. As a result, turning of the front wheels 12 is assisted and thus the driver's steering load is reduced.

1-2. Steering Angle Return Control

Figure 3:
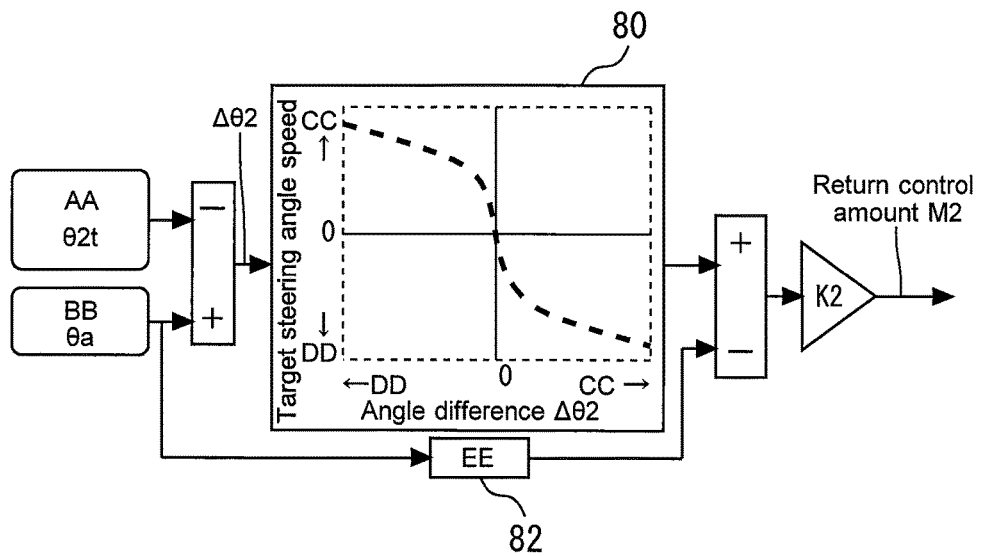
FIG. 3 is a block diagram that illustrates the outline of steering angle return control performed by a steering angle return control section.

FIG. 3 is a block diagram that illustrates the outline of the steering angle return control performed by the steering angle return control section 54.

1-2-1. Steering Angle Speed Map Used for Steering Angle Return Control

The steering angle return control section 54 stores a steering angle speed map 80 that defines a relationship between a target steering angle speed [deg/s] and an angle difference $\Delta\theta 2$ [deg]. FIG. 3 represents an example of setting of the steering angle speed map 80. In addition, the angle difference $\Delta\theta 2$ corresponds to the "second angle difference" according to the present disclosure, and the target steering angle speed used for the steering angle return control corresponds to the "second target steering angle speed" according to the present disclosure.

The angle difference $\Delta\theta 2$ shown in FIG. 3 is a difference between the actual steering angle $\theta a$ of the front wheels 12 and the target steering angle $\theta 2t$. In more detail, in the example shown in FIG. 3, the angle difference $\Delta\theta 2$ is a difference obtained by subtracting the target steering angle $\theta 2t$ from the actual steering angle $\theta a$. The steering angle return control is performed to return the actual steering angle $\theta a$ of the front wheels 12 to the neutral point as described above. Thus, the target steering angle $\theta 2t$ in the steering angle return control is the neutral point. Therefore, the origin of the horizontal axis of the steering angle speed map 80 shown in FIG. 3 is the neutral point (that is, the angle difference is zero). Also, it is assumed herein that the steering angle of the front wheels 12 (that is, the steering angle of the steering wheel 22) obtained when the steering wheel 22 is turned to the right with respect to the neutral point is a positive value. Thus, in the steering angle return control, the angle difference Δθ2 becomes positive when the steering wheel 22 is turned to the right.

The steering angle speed [deg/s] is a change rate of the steering angle of the front wheels 12, and the target steering angle speed is a target value thereof. With respect to the vertical axis of the steering angle speed map 80 shown in FIG. 3, it is assumed that the target steering angle speed becomes zero at the origin and has a positive value while the steering wheel 22 is turned to the right.

Here, a time when the steering wheel 22 is being turned right with respect to the neutral point is referred to as a "during steering right", and, conversely, a time when the steering wheel 22 is being turned left with respect to the neutral point is referred to as a "during steering left". Hereinafter, by taking an example of during steering right, the setting of the steering angle speed map 80 is described. During steering right, the angle difference Δθ2 described above has a positive value. The target steering angle speed corresponding to a positive angle difference Δθ2 has a negative value as shown in FIG. 3. When the steering wheel 22 is returned to the neutral point by the steering angle return control during steering right, the steering wheel 22 rotates on the left side. Moreover, according to the aforementioned definition for the sign condition of the steering angle speed, when the target steering angle speed has a negative value, the steering wheel 22 is rotating on the left side. Therefore, according to the steering angle speed map 80, the target steering angle speed for returning the steering angle toward the neutral point can be determined on the basis of the angle difference Δθ2.

Furthermore, according to the steering angle speed map 80, the greater the angle difference Δθ2 during steering right is, the greater the value of the target steering angle speed is on the negative side. According to this kind of setting, when the steering angle is returned toward the neutral point, the steering angle can be returned with a change rate that is higher when the angle difference Δθ2 is greater. Moreover, according to the steering angle speed map 80, the setting of the target steering angle speed depending on this kind of angle difference Δθ2 is obtained similarly during steering left.

1-2-2. Calculation of Return Control Amount M2

The steering angle return control section 54 calculates the angle difference Δθ2 that is a difference between the actual steering angle θa of the front wheels 12 calculated on the basis of the output of the steering angle sensor 62 and the target steering angle (that is, the neutral point) θ2t. Also, the steering angle return control section 54 calculates the target steering angle speed depending on the angle difference Δθ2 by referring to the steering angle speed map 80 having the angle difference Δθ2 as an input parameter.

The steering angle return control section 54 calculates the actual steering angle speed by differentiating the actual steering angle θa with respect to time at a differentiator 82. Also, the steering angle return control section 54 calculates a steering angle speed difference that is a difference between the target steering angle speed and the actual steering angle speed (more specifically, a difference obtained by subtracting the actual steering angle speed from the target steering angle speed).

The steering angle return control section 54 calculates a return control amount M2 by multiplying the steering angle speed difference described above by a certain proportional gain K2. In more detail, the return control amount M2 has a correlation with the return torque described above. The steering angle return control section 54 calculates the target electric current command value responsive to the return control amount M2 and outputs a calculated target electric current command value to the EPS driver 44 to drive the electric motor 42. As a result, the electric motor 42 generates a return torque. In addition, the proportional gain K2 corresponds to the "second gain" according to the present disclosure.

Based on a self-aligning torque which the front wheels 12 that are the steered wheels receives from the road, a restoring force for causing the actual steering angle θa of the front wheels 12 to approach the neutral point acts on the vehicle 10 during traveling. However, there is the possibility that it may be difficult for only this kind of self-aligning torque to surely return the actual steering angle θa to the neutral point after the driver ends a steering operation. If a large amount of operation of the steering wheel 22 by the driver for correction is required due to the fact that the actual steering angle θa does not return to the neutral point smoothly, a comfortable steering performance is not achieved. In contrast to this, according to the steering angle return control, the actual steering angle θa of the front wheels can be returned to the neutral point more surely and more smoothly by the use of the EPS device 40. Therefore, the steering performance can be improved while reducing the driver's steering load.

2. Automated Steering Control (Steering Control During Automated Driving)

While the selection switch 72 is turned ON (that is, during execution of the automated driving), the driving entity including the steering operation shifts from the driver to the automated driving system. Additionally, although the automated steering control allows an intervention of the driver with respect to the steering operation, the automated steering control is basically performed without the need of the steering operation by the driver.

The automated steering control section 56 automatically controls the steering angle of the front wheels 12 by the use of the EPS device 40. That is, the EPS device 40 used for the "steering torque assist control" or the "steering angle return control" during non-execution of the automated driving is used for the "automated steering control" during execution of the automated driving.

Figure 4:
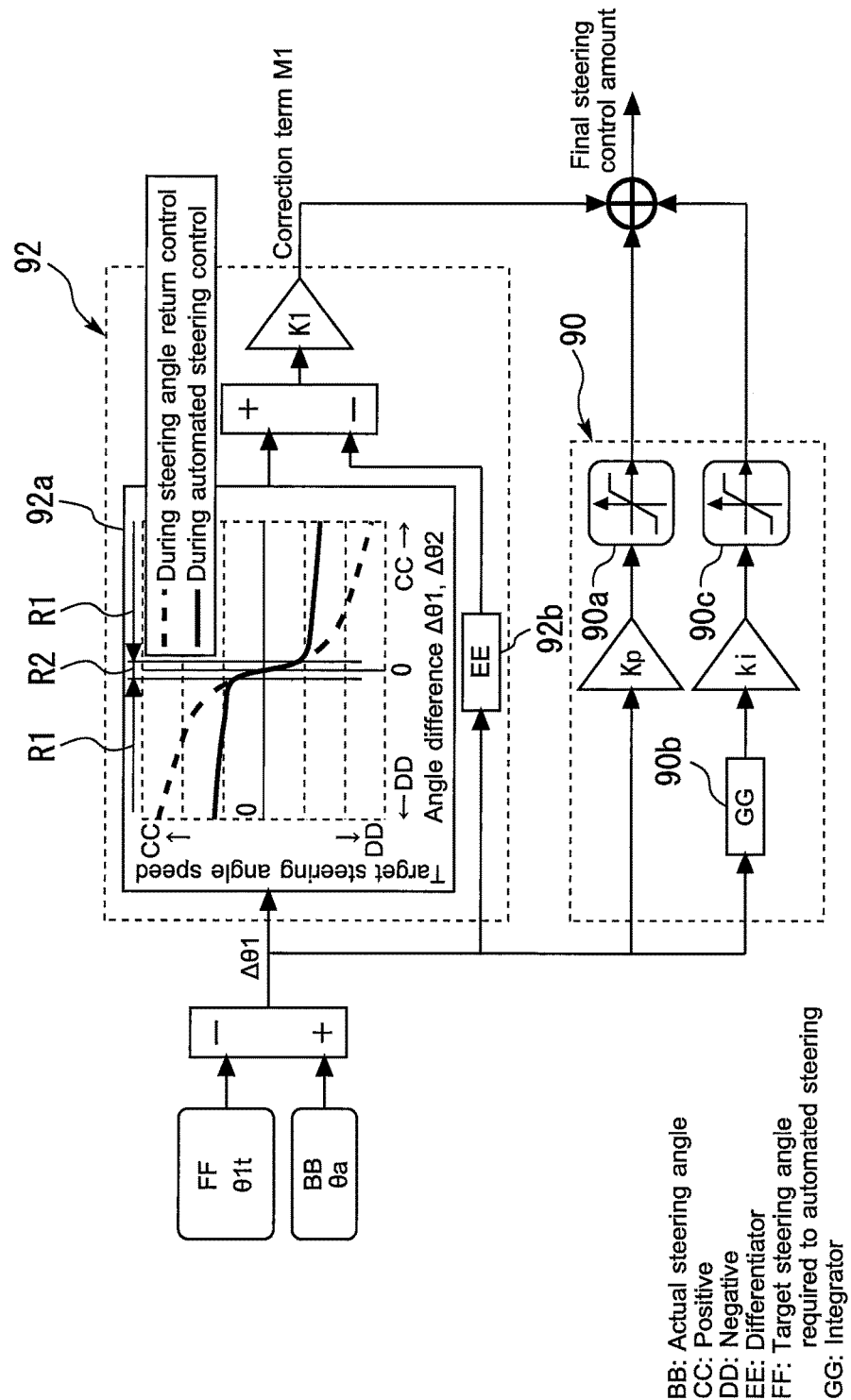
FIG. 4 is a block diagram that illustrates the outline of automated steering control performed by an automated steering control section.

FIG. 4 is a block diagram that illustrates the outline of the automated steering control performed by the automated steering control section 56.

2-1. Calculation of Target Steering Angle θ1t

According to the automated steering control, the actual steering angle θa of the vehicle 10 is controlled such that the vehicle 10 travels along a target path (a target line). The target path can be determined as a driving path located near the center of a driving lane that is detected based on the image data from the stereo camera of the driving environment detection device 70. The automated steering control section 56 calculates the target steering angle θ1t of the front wheels 12 required to the automated steering control. As an example, the target steering angle θ1t can be calculated as follows. That is, based on a detected driving lane, the automated steering control section 56 calculates the radius of curvature of the driving lane, an offset amount of the vehicle 10 with respect to the driving lane (more specifically, the amount of deviation of the center line of the vehicle 10 in a vehicle longitudinal direction with respect to the center line of the driving lane), and a yaw angle.

The automated steering control section 56 calculates the target steering angle θ1t on the basis of the radius of curvature, the offset amount and the yaw angle that have been calculated. To be more specific, the calculation of the target steering angle θ1t is, for example, performed as follows. The automated steering control section 56 calculates a lateral acceleration required to cause the vehicle to run along the target path, on the basis of the radius of curvature of a detected driving lane. Moreover, the automated steering control section 56 performs feedback control to calculate a lateral acceleration required to cause the offset amount to approach a target offset amount, on the basis of the difference between a calculated offset amount and a target offset amount that is set in advance. Furthermore, the automated steering control section 56 performs feedback control to calculate a lateral acceleration required to cause the yaw angle to approach a target yaw angle, on the basis of the difference between a calculated yaw angle and a target yaw angle that is set in advance. On that basis, the automated steering control section 56 calculates a target lateral acceleration by adding these three lateral accelerations to each other. The automated steering control section 56 stores a map (not shown) that defines a relationship between input parameters, such as the target lateral acceleration and the vehicle speed V, and the target steering angle θ1t. The target steering angle θ1t is calculated, from this kind of map, as a value required to generate the target lateral acceleration for the vehicle 10.

2-2. Basic Processing of Automated Steering Control (PI Control Amount Calculation Section 90)

The automated steering control section 56 performs PI control as an example of the basis steering control for causing an actual driving path of the vehicle 10 to a target path. In more detail, the automated steering control section 56 includes a PI control amount calculation section 90 that calculates a steering control amount by this PI control as shown in FIG. 4. In addition, this steering control amount (more specifically, proportional term and integral term described below) calculated by the PI control amount calculation section 90 corresponds to the "basic steering control amount" according to the present disclosure.

The automated steering control section 56 calculates an angle difference Δθ1 that is a difference between the actual steering angle θa and the target steering angle θ1t (more specifically, a difference obtained by subtracting the target steering angle θ1t from the actual steering angle θa, as an example). The PI control amount calculation section 90 calculates the proportional term of the steering control amount by multiplying the angle difference Δθ1 by a certain proportional gain Kp. The calculated proportional term is outputted to an upper and lower limit guard section 90a. If the calculated proportional term deviates from a predetermined range, the upper and lower limit guard section 90a limits the calculated value of the proportional term so as to fall within the predetermined range. In addition, the angle difference Δθ1 corresponds to the "first angle difference" according to the present disclosure.

Furthermore, the PI control amount calculation section 90 integrates the angle difference Δθ1 with respect to time at an integrator 90b to calculate an integral value of the angle difference Δθ1. The PI control amount calculation section 90 also calculates an integral term of the steering control amount by multiplying the integral value of the angle difference Δθ1 by a certain integral gain Ki. As with the calculation value of the proportional term, an upper and lower limit guard section 90c also limits the calculation value of the integral term, depending on the magnitude of the integral value, so as to fall within a predetermined range.

2-3. Correction Term Calculation Section 92 that Calculate Correction Term M1 according to Steering Angle Speed With the proportional term and the integral term (which are basic steering control amounts) of the steering control amount calculated by the PI control amount calculation section 90 described above being used, the target path of the vehicle 10 can be basically followed by the actual driving path. On that basis, in order to cause the actual driving path to more quickly follow the target path, as shown in FIG. 4, the automated steering control section 56 includes, with respect to the steering control amount, the correction term calculation section 92 that calculates a correction term M1 according to the steering angle speed. In addition, the correction amount M1 corresponds to the "correction term" according to the present disclosure.

2-3-1. Setting of Steering Angle Speed Map Used for Automated Steering Control

The correction term calculation section 92 stores a steering angle speed map 92a that defines a relationship between the target steering angle speed and the angle difference Δθ1. FIG. 4 represents an example of setting of the steering angle speed map 92a. In more detail, in FIG. 4, the relationship between the target steering angle speed and the angle difference Δθ1 in the steering angle speed map 92a is shown by a solid line. The relationship shown by a broken line in FIG. 4 is referred to for comparison with the setting of the steering angle speed map 92a, and is a relationship between the target steering angle speed and the angle difference Δθ2 in the steering angle speed map 80 (see FIG. 3) used for the steering angle return control described above. In addition, the target steering angle speed used for the automated steering control corresponds to the "first target steering angle speed" according to the present disclosure.

The target steering angle θ1t used along with the actual steering angle θa for calculation of the angle difference Δθ1 inputted to the steering angle speed map 92a shown in FIG. 4 is a target steering angle required to the automated steering control, contrary to the neutral point that is the target steering angle θ2t in the steering angle return control. Thus, the origin of the angle difference Δθ1 is not a neutral point and is obtained when the target steering angle θ1t required to the automated steering control coincides with the actual steering angle θa.

Figure 5:
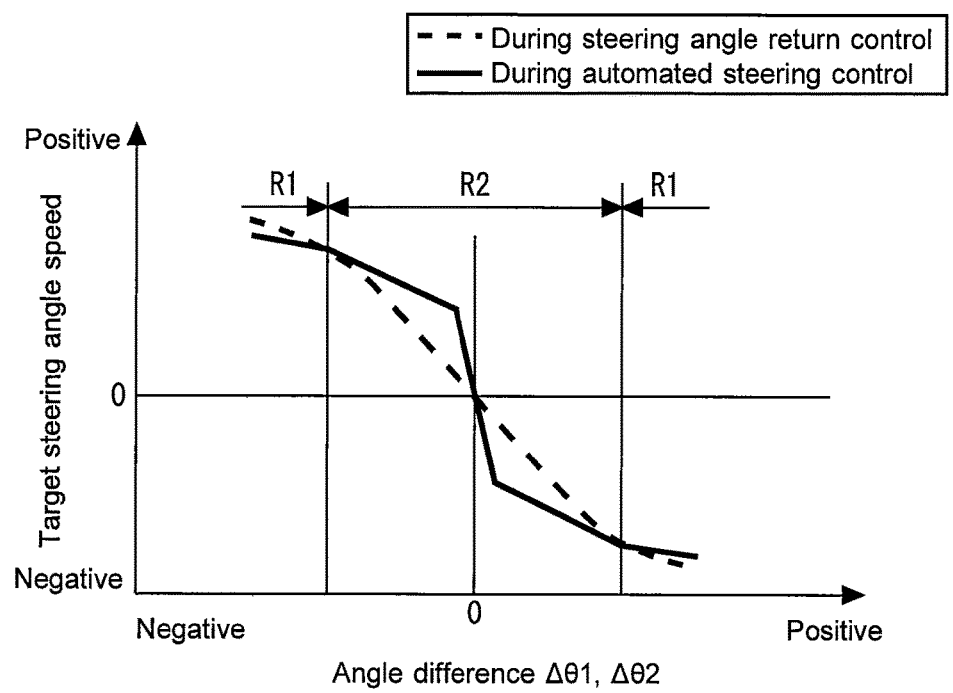
FIG. 5 is an enlarged view that illustrates an example of setting of a steering angle speed map in an angle difference range R2 shown in FIG. 4.

FIG. 5 is an enlarged view that illustrates an example of setting of the steering angle speed map 92a in an angle difference range R2 shown in FIG. 4. An angle difference range located outside the angle difference range R2 on both of the positive and negative sides of the angle differences Δθ1 and Δθ2 is herein referred to as R1. In addition, the angle difference range R1 corresponds to the "first angle difference range" according to the present disclosure, and the angle difference range R2 corresponds to the "second angle difference range" according to the present disclosure.

The angle difference range R2 is a range that is used at a time when the actual steering angle θa is caused to follow the target steering angle θ1t during execution of the automated steering control (that is, at a time when the actual driving path is caused to follow the target path). In other words, the angle difference range R2 is a range within which the angle difference falls at this time. Because of this, it can be said that a value of the angle difference at the boundary between the angle difference range R2 and the angle difference range R1 (that is, a maximum value of absolute value of the angle difference within the angle difference range R2) is meaningful as un upper limit value that is capable of ensuring the compliance of the actual steering angle θa to the target steering angle θ1t. It can also be said that the angle difference range R2 is such a small angle difference range so as not to be used when the driver steers the steering wheel 22 to change direction of the vehicle 10 on the basis of the intention of the driver. In addition, the maximum value of absolute value of the angle difference within the angle difference range R2 corresponds to the "certain value" according to the present disclosure.

On the other hand, the angle difference range R1 is used during the steering operation by the driver. Additionally, from the viewpoint of ensuring the compliance described above, the angle difference range R1 is a range which is not scheduled for use when the actual steering angle θa is caused to follow the target steering angle θ1t in the automated steering control. However, even during execution of the automated steering control, the angle difference range R1 may be used. An example thereof is when a steering intervention of the driver is performed.

As shown in FIGS. 4 and 5, the absolute value of the target steering angle speed used for the automated steering control is set to be greater when the absolute value of the angle difference Δθ1 is greater. Moreover, as can be seen by comparing the solid line and the broken line shown in FIGS. 4 and 5 concerning the target steering angle speed characteristics with respect to the respective angle differences Δθ1 and Δθ2, the target steering angle speed characteristics of the automated steering control and the target steering angle speed characteristics of the steering angle return control are different in that the magnitude relation of (absolute value of) the target steering angle speeds is reversed depending on whether the angle difference range R2 or the angle difference range R1 is used. To be more specific, in the angle difference range R1 that is relatively greater, as shown in FIG. 4, (the absolute value of) the target steering angle speed in the automated steering control is lower than that in the steering angle return control under the same angle difference. On the other hand, in the angle difference range R2 that is relatively smaller, as shown in FIG. 5, (the absolute value of) the target steering angle speed in the automated steering control is higher than that in the steering angle return control under the same angle difference.

2-3-2. Calculation of Correction Term M1

The correction term calculation section 92 calculates the target steering angle speed according to the angle difference Δθ1 by referring to the steering angle speed map 92a that uses the angle difference Δθ1 as an input parameter. Moreover, the correction term calculation section 92 calculates the change rate [deg/s] of the angle difference Δθ1 by differentiating the angle difference Δθ1 with respect to time at a differentiator 92b. The steering angle speed map 92 also calculates a speed difference that is a difference between the target steering angle speed and the change rate of the angle difference Δθ1 (more specifically, a difference obtained by subtracting the change rate of the angle difference Δθ1 from the target steering angle speed).

The correction term calculation section 92 calculates a correction term M1 regarding the steering control amount in accordance with the steering angle speed by multiplying the speed difference described above by a certain proportional gain K1. In addition, the proportional gain K1 corresponds to the "first gain" according to the present disclosure.

2-3-3. Setting of Proportional Gain K1

In the present embodiment, the proportional gain K1 used for calculation of the correction term M1 is determined in advance so as to be a value that is greater than the proportional gain K2 used for calculation of the return assist control amount in the steering angle return control.

2-4. Calculation of Final Steering Control Amount

The automated steering control section 56 calculates a final steering control amount by adding the proportional term and the integral term of the steering control amount calculated by the PI control amount calculation section 90 (that is, the basic steering control amount) and the correction term M1 calculated by the correction term calculation section 92 to each other. On that basis, the automated steering control section 56 calculates a target electric current command value according to the final steering control amount and outputs a calculated target electric current command value to drive the electric motor 42 of the EPS device 40. As a result, the actual steering angle θa of the front wheels 12 is controlled so as to be the target steering angle θ1t by the automated steering function with the EPS device 40. In more detail, feedback control for causing the actual steering angle θa of the front wheels 12 to approach the target steering angle θ1t is performed.

Figure 6:
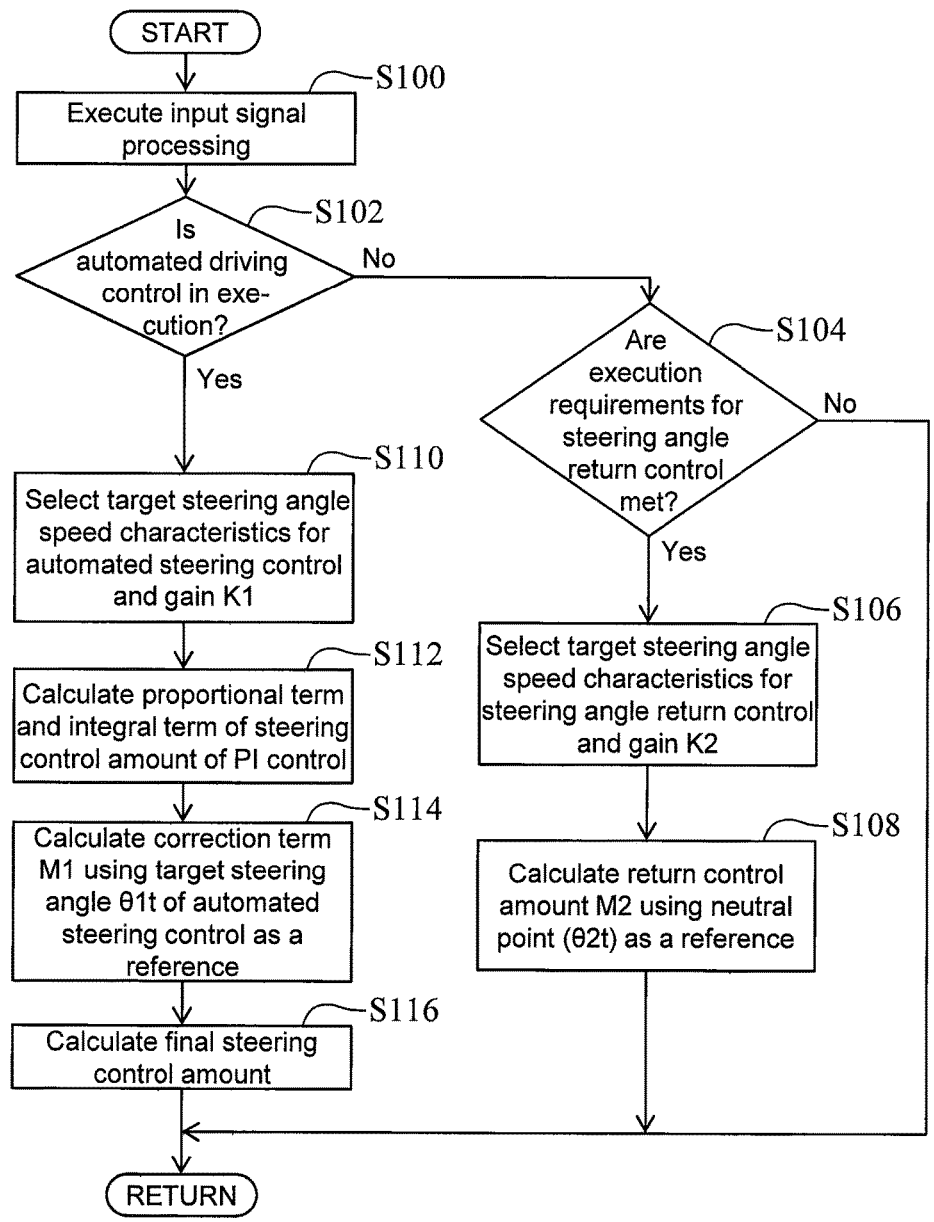
FIG. 6 is a flow chart that shows a routine of characteristic processing related to the steering angle return control and the automated steering control according to the embodiment of the present disclosure.

3. Processing Related to Steering Angle Return Control and Automated Steering Control FIG. 6 is a flow chart that shows a routine of characteristic processing related to the steering angle return control and the automated steering control according to this embodiment of the present disclosure. The present routine focuses on the processing regarding the steering angle return control and the automated steering control to be performed during traveling of the vehicle 10. The processing of the present routine is repeatedly performed at a predetermined interval during traveling of the vehicle 10.

First, the ECU 50 executes an input signal processing (step S100). More specifically, the ECU 50 acquires various sensor signals, the driving environment information from the driving environment detection device 70, and a signal from the selection switch 72. The various sensor signals is exemplified by the steering torque signal, the steering angle signal and the vehicle speed signal that are inputted from the various sensors, such as the steering torque sensor 60 connected to the ECU 50.

Next, the ECU 50 determines whether or not the automated driving control is in execution (step S102). When the selection switch 72 is turned ON by the driver, the ECU 50 executes the automated driving control including the automated steering control, as far as predetermined execution requirements are met. If the automated driving control is in execution, the ECU 50 turns ON a flag that indicates that the automated driving control is in execution. If, on the other hand, the automated driving control is not in execution, the ECU 50 turns OFF the flag. In this step S102, the ECU 50 determines whether or not the automated driving control is in execution, on the basis of the status of this kind of flag.

If the ECU 50 determines in step S102 that the automated driving control is not in execution, it determines whether or not predetermined execution requirements regarding the steering angle return control are met (step S104). The execution requirements of the steering angle return control are met when a steering operation by the driver is ended. If the steering operation by the driver is ended, the steering torque Ta by the driver rapidly decays. It can therefore be determined whether or not a steering operation by the driver has been ended, (that is, whether or not the execution requirements of the steering angle return control are met) by determining, for example, whether or not the steering torque Ta falls below a certain threshold value.

If the ECU 50 determines in step S104 that the execution requirements of the steering angle return control are not met, it promptly ends the processing of the routine currently in progress. In addition, if the execution requirements of the steering angle return control are not met as just described, the steering torque assist control is performed.

If, on the other hand, the ECU 50 determines in step S104 that the execution requirements of the steering angle return control are met, it selects the target steering angle speed characteristics for the steering angle return control (step S106). More specifically, the ECU 50 (the steering angle return control section 54) calculates a target steering angle speed according to the current angle difference $\Delta\theta2$ by referring to the steering angle speed map 80 shown in FIG. 3. Also, in this step S106, the ECU 50 selects the proportional gain K2 (see FIG. 3).

The ECU 50 then calculates a return control amount M2 using the neutral point (that is, the target steering angle $\theta2t$) as a reference (step S108). More specifically, the target steering angle speed during execution of the steering angle return control has been calculated by the processing of step S106 using the target steering angle $\theta2t$ that is the neutral point as a reference. In this step S108, as already described with reference to FIG. 3, the return control amount M2 is calculated on the basis of the target steering angle speed and the proportional gain K2 (see FIG. 3). If processing proceeds to step S108, the ECU 50 (the steering angle return control section 54) actuates the EPS device 40 such that a return torque according to the return control amount M2 is generated by the electric motor 42.

If, on the other hand, the ECU 50 determines in step S102 that the automated driving control is in execution, it selects the target steering angle speed characteristics for the automated steering control (step S110). More specifically, the ECU 50 (the correction term calculation section 92) calculates the target steering angle speed according to the current angle difference $\Delta\theta1$ by referring to the steering angle speed map 92a shown in FIG. 4. Also, in this step S110, the ECU 50 selects the proportional gain K1 (see FIG. 4).

Next, the ECU 50 (the PI control amount calculation section 90) calculates the proportional term and the integral term of the steering control amount (that is, the basic steering control amount) (step S112).

Next, the ECU 50 (the correction term calculation section 92) calculates a correction term M1 according to the steering angle speed using the target steering angle $\theta1t$ of the automated steering control as a reference (step S114). More specifically, the target steering angle speed during execution of the automated steering control has been calculated by the processing of step S110 using, as a reference, the target steering angle $\theta1t$ that is required for the automated steering control. In this step S114, as already described with reference to FIGS. 4 and 5, the correction term M1 is calculated on the basis of the target steering angle speed and the proportional gain K1 (see FIG. 4).

Next, the ECU 50 (the automated steering control section 56) calculates a final steering control amount (step S116). More specifically, the ECU 50 calculates the final steering control amount by adding the proportional term and the integral term of the steering control amount calculated in step S112 and the correction term M1 calculated in step S114 to each other. If processing proceeds to step S114, the ECU 50 (the automated steering control section 56) actuates the EPS device 40 such that the return torque according to the final steering control amount is generated by the electric motor 42.

[Advantageous Effects of This Embodiment]

According to the present embodiment described so far, in reverting to the automated steering control after a steering intervention of the driver is performed during execution of the automated steering control and causing the actual steering angle $\theta a$ of the front wheels 12 to approach the target steering angle $\theta1t$, the steering angle speed of the front wheels 12 is controlled in accordance with the relationship of the steering angle speed map 92a (solid line) shown in FIGS. 4 and 5.

To be more specific, at a time when the actual steering angle $\theta a$ of the front wheels 12 is caused to follow the target steering angle $\theta1t$ during execution of the automated steering control without the intervention of the driver with respect to the steering operation, the angle difference range R2 (see FIG. 4) is used. If the intervention of the driver with respect to the steering operation is performed at this time, the ECU 50 recognizes the steering operation as a trigger, and the entity of the steering control is thus returned to the driver. As a result, the angle difference range transitions from R2 to R1. In addition, in reverting to the automated steering control after a steering intervention of the driver is performed, the angle difference range transitions from R1 to R2 in the course of the actual steering angle $\theta a$ approaching the target steering angle $\theta1t$.

According to the target steering angle speed characteristics shown in FIG. 4, under comparison in a condition where the angle differences $\Delta\theta1$ and $\Delta\theta2$ are equal to each other, when the angle difference range R1 is used during execution of the automated steering control, the target steering angle speed (solid line) that is lower, as an absolute value, than the target steering angle speed (broken line) used during execution of the steering angle return control is selected. Thus, in the course of the actual steering angle $\theta a$ approaching the target steering angle $\theta1t$ after reverting to the automated steering control after a steering intervention of the driver is performed (in the following description, simply abbreviated to a "process of convergence"), this kind of lower target steering angle speed is selected. According to the control structure of the automated steering control section 56 shown in FIG. 4, in order to cause the angle difference $\Delta\theta1$ generated as a result of the intervention of the driver with respect to the steering operation (that is, a greater angle difference than that when the compliance of the actual steering angle $\theta a$ to the target steering angle $\theta1t$ by the automated steering control is ensured) to promptly converge, the correction term M1 fulfills a greater role as compared to other steering control amounts (that is, the proportional term and the integral term). That is, the correction term M1 highly affects the change rate of the actual steering angle $\theta a$ (that is, the actual steering angle speed) during the process of convergence described above as compared to the other steering control amounts.

As describe so far, according to the steering control of the present embodiment that is performed while focusing on the steering angle speed in the process of convergence described above, the actual steering angle speed in the process of convergence is controlled using the correction term M1. As a result, under comparison in a condition where the angle differences $\Delta\theta1$ and $\Delta\theta2$ are equal to each other, the actual steering angle $\theta a$ of the front wheels 12 can be changed with a lower change rate in the process of convergence described above as compared to when the actual steering angle $\theta a$ is returned to the neutral point (the target steering angle $\theta2t$) during the execution of the steering angle return control.

The steering angle return control (that is, the control for returning the actual steering angle $\theta a$ to the neutral point after a steering operation by the driver is ended) is performed when the driver that is the driving entity does not have an intention to steer (in other words, when the return of the actual steering angle $\theta a$ to the neutral point is allowed). In contrast to this, the control to return the actual steering angle θa to the target steering angle θ1t after a steering intervention of the driver is performed during execution of the automated steering control is not based on the intention of the driver (more specifically, according to this control, a steering operation is performed toward the target steering angle θ1t which the driver does not always recognize). According to the control of the present embodiment described above, when a steering operation toward the target steering angle θ1t is performed by this kind of automated steering control, a change of the actual steering angle θa can be slowed as compared to during execution of the steering angle return control in which it can be said that the driver can recognize a possible change of the actual steering angle θa. Therefore, according to the control of the present embodiment, the steering angle speed in the process of convergence can be controlled properly and softly while reducing a feeling of strangeness of the driver regarding the automated steering.

Moreover, according to the present embodiment, under comparison in a condition where the angle differences Δθ1 and Δθ2 are equal to each other, as shown in FIG. 5, in the angle difference range R2 used when the actual steering angle θa of the front wheels 12 is caused to follow the target steering angle θ1t during execution of the automated steering control without the intervention of the driver with respect to the steering operation, the target steering angle speed (solid line) that is higher (as an absolute value) than the target steering angle speed (broken line) used during execution of the steering angle return control is selected. According to the target steering angle speed selected in this way, the compliance of the actual steering angle θa to the target steering angle θ1t can be highly ensured during execution of the automated steering control.

Moreover, according to the present embodiment, the correction term M1 described above is calculated so as to cause the "change rate of the angle difference Δθ1" to approach the target steering angle speed according to the angle difference Δθ1. According to this example in which the change rate of the angle difference Δθ1, not the actual steering angle speed itself, is caused to follow the target steering angle speed as just described, the change rate of the angle difference Δθ1 (that is, the difference of the actual steering angle θa with respect to the target steering angle θ1t) can be caused to follow the target steering angle speed. Thus, as compared to an example in which the actual steering angle speed itself is caused to follow the target steering angle speed, the actual steering angle speed can be caused to approach the target steering angle speed while highly ensuring the compliance of the actual steering angle θa to the target steering angle θ1t.

Furthermore, according to the present embodiment, the proportional gain K1 used for the calculation of the correction term M1 in the automated steering control is greater than the proportional gain K2 used for the calculation of the return control amount M2 in the steering angle return control. The setting of this kind of proportional gains K1 and K2 may not be always combined with the setting of the target steering angle speed described above, and the proportional gains K1 and K2 may thus be the same value, for example. On that basis, the following advantageous effects can be achieved due to the fact that the setting in which the proportional gain K1 is greater than the proportional gain K2 is caused to accompany the setting of the target steering angle speed. That is, with respect to the process of convergence described above, the compliance of the change rate of the angle difference Δθ1 to the target steering angle speed can be enhanced more effectively as compared to an example in which the proportional gain K1 is the same as the proportional gain K2. Thus, the actual steering angle speed during the process of convergence described above can be controlled more properly and more softly. Also, with respect to the example in which the angle difference range R2 is used and the actual steering angle θa is caused to follow the target steering angle θ1t without the intervention of the driver with respect to the steering operation, according to the setting of the proportional gains K1 and K2 described above, the compliance of the actual steering angle θa to the target steering angle θ1t can be ensured more effectively as compared to the example in which the proportional gain K1 is the same as the proportional gain K2.

What is claimed is:

1. A driver assistance system for a vehicle,
the vehicle including an electric power steering device equipped with an electric motor that is driven to control a steering angle of a wheel, wherein the driver assistance system comprises:
an electronic control unit configured to act as:
an automated steering control section that performs automated steering control by controlling the electric motor so as to generate a steering torque for causing an actual steering angle of the wheel to approach a target steering angle; and
a steering angle return control section that performs steering angle return control by controlling controls the electric motor so as to generate a return torque for returning the actual steering angle of the wheel to a neutral point in response to a steering operation by a driver being ended during non-execution of the automated steering control, and
wherein, in a condition where a first angle difference between the actual steering angle of the wheel and the target steering angle in the automated steering control is equal to a second angle difference between the actual steering angle of the wheel and the neutral point in the steering angle return control, the driver assistance system is configured, in reverting to the automated steering control after a steering intervention of the driver is performed during execution of the automated steering control and causing the actual steering angle of the wheel to approach the target steering angle, to change the actual steering angle of the wheel with a change rate that is lower than a change rate in returning the actual steering angle of the wheel to the neutral point during execution of the steering angle return control.

2. The driver assistance system according to claim 1, wherein the automated steering control section is further configured to calculate a basic steering control amount for causing the first angle difference to approach zero and a correction term for reducing an absolute value of a difference between a first target steering angle speed based on the first angle difference and a change rate of the first angle difference, and to calculate, as a final steering control amount, a sum of the basic steering control amount and the correction term that are calculated,
wherein the steering angle return control section is further configured to calculate a return control amount for reducing an absolute value of a difference between a second target steering angle speed based on the second angle difference and an actual steering angle speed of the wheel during execution of the steering angle return control,
wherein, in a first angle difference range in which an absolute value of the first angle difference is greater than a certain value, the first target steering angle speed is lower than the second target steering angle speed under comparison in the condition where the first angle difference is equal to the second angle difference, wherein, in a second angle difference range in which the absolute value of the first angle difference is smaller than or equal to the certain value, the first target steering angle speed is higher than the second target steering angle speed under comparison in the condition where the first angle difference is equal to the second angle difference, wherein the first angle difference range is used during a steering operation by the driver being performed in the automated steering control, and wherein the second angle difference range is used during the actual steering angle of the wheel being caused to follow the target steering angle without a steering operation by the driver in the automated steering control.

3. The driver assistance system according to claim 2, wherein the correction term is obtained by multiplying the difference between the first target steering angle speed and the change rate of the first angle difference by a first gain, wherein the return control amount is obtained by multiplying the difference between the second target steering angle speed and an actual steering angle speed by a second gain, and wherein the first gain is greater than the second gain.

* * * * *